(12) United States Patent
Linnell et al.

(10) Patent No.: US 7,873,851 B1
(45) Date of Patent: Jan. 18, 2011

(54) POWERING DISK DRIVE SPINUP

(75) Inventors: Thomas E. Linnell, Northborough, MA (US); Phillip J. Roux, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 745 days.

(21) Appl. No.: 11/904,832

(22) Filed: Sep. 28, 2007

(51) Int. Cl.
*G06F 1/00* (2006.01)
*H02P 6/00* (2006.01)
*H02K 29/08* (2006.01)
*G11B 11/00* (2006.01)
*G06F 12/00* (2006.01)
*G06F 11/00* (2006.01)

(52) U.S. Cl. .................. 713/330; 713/300; 318/400.16; 318/400.39; 369/13.11; 369/13.17; 711/111; 714/14

(58) Field of Classification Search .................. 713/300, 713/330; 318/400.16, 400.39; 369/13.11, 369/13.17; 711/111; 714/14
See application file for complete search history.

(56) References Cited

U.S. PATENT DOCUMENTS

| | | | |
|---|---|---|---|
| 3,997,832 A * | 12/1976 | Tanaka et al. | 363/60 |
| 5,471,353 A * | 11/1995 | Codilian et al. | 360/73.03 |
| 5,532,563 A * | 7/1996 | Kodama et al. | 318/440 |
| 6,353,894 B1 * | 3/2002 | Pione | 713/340 |
| 7,761,718 B2 * | 7/2010 | Yasuo et al. | 713/300 |

\* cited by examiner

*Primary Examiner*—Stefan Stoynov
(74) *Attorney, Agent, or Firm*—Krishnendu Gupta; Jason A. Reyes

(57) ABSTRACT

A method is used in powering disk drive spinup. A disk drive is powered with a primary power source and is temporarily powered with a secondary power source in addition to the primary power source. The secondary power source powers the disk drive when the disk drive is spinning up.

17 Claims, 6 Drawing Sheets

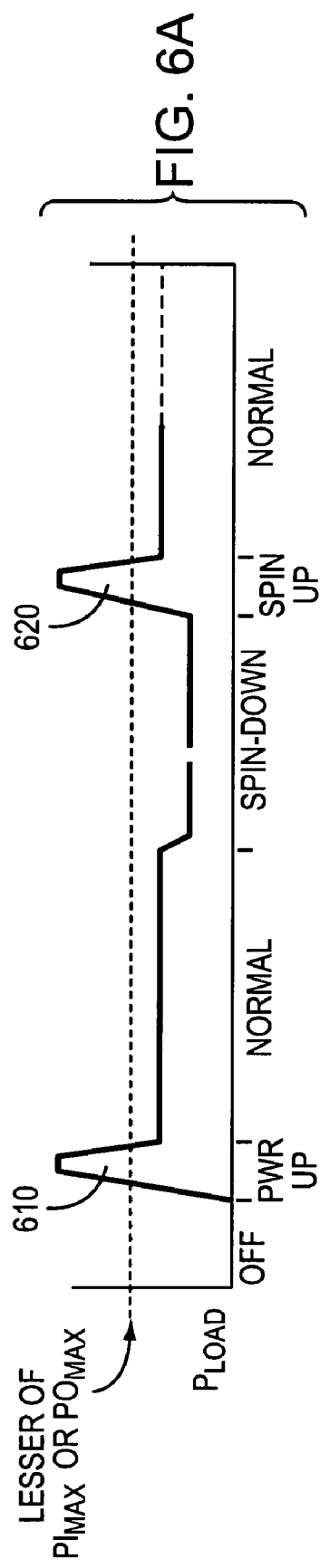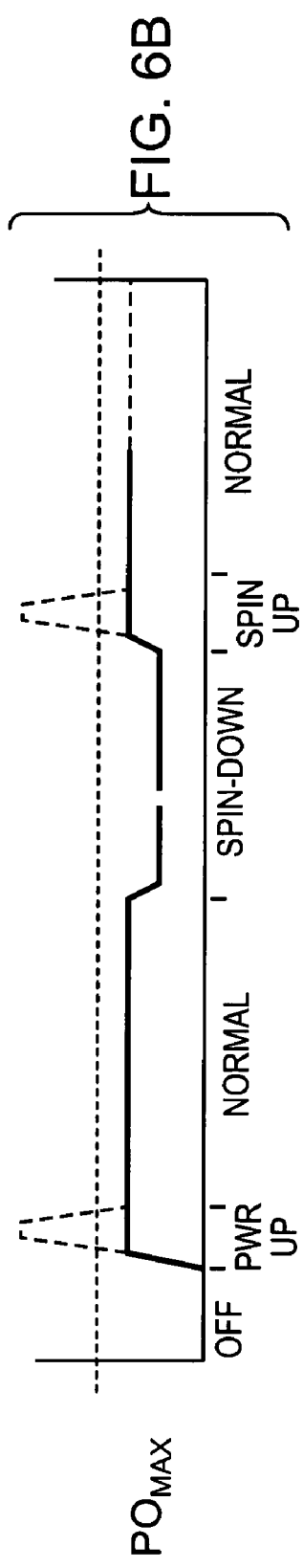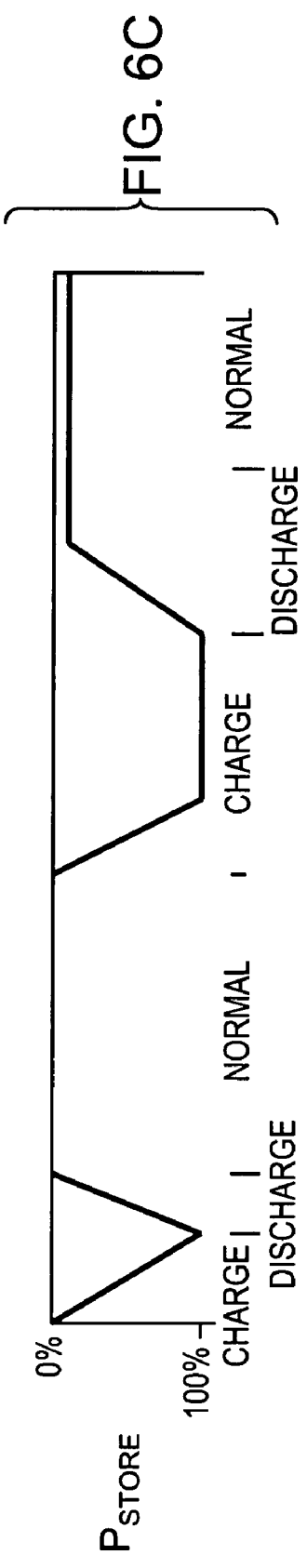

POWERING DISK DRIVE SPINUP

BACKGROUND OF THE INVENTION

The need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss. And computing systems of all types are not only accommodating more data but are also becoming more and more interconnected, raising the amounts of data exchanged at a geometric rate.

Thus, today's data storage systems are used in computing environments for generating and storing large amounts of critical data. Some storage systems support many (e.g., hundreds) of disk drives. A hard disk drive is typically a device including a magnetic head, a motor, and one or more platters that store information. The motor turns a platter underneath the magnetic head.

The platter contains electrically encoded data that is detected by the magnetic head as the head passes over the platter. The platter can be read from or written to and is generally used to store data that will be accessed by the system. The hard disk drive is typically referred to as random access memory and is familiar to those skilled in the art.

Typically, data is arranged in concentric circles on the platter. The magnetic head is moved along a radius of the platter, and the magnetic head reader/writer accesses particular locations within the platter as the platter spins under the magnetic head. Those skilled in the art are familiar with the read and write operations of hard disk drives.

Constantly spinning the platter in the hard disk drive consumes a large amount of power. Specifically, a motor must be devoted to spinning the platter to allow access to the full physical array of data on the platter.

Powering a mechanical device, such as a motor, consumes a significant amount of power relative to the power consumed by the electronic circuitry within the system.

The consumption of electrical power is a major concern in many environments. For example, in data centers, computing equipment such as storage systems cause power consumption not only directly but also indirectly, because cooling equipment such as air conditioners are required to remove the heat given off by the computing equipment (and in at least some cases, since cooling equipment is not 100% efficient, the indirect consumption exceeds the direct consumption). In another example, power consumption is a major factor in the design and construction of portable computers. At least some of the concern over power consumption relating to portable computers arises due to their reliance upon batteries with a short life, e.g., batteries with a short life due to limited energy storage capacity.

In a typical practical implementation, a disk drive may consist of circuit board logic and a Head and Disc Assembly (HDA). The HDA portion of the disk drive includes the spindles platters, head arm and motor that make up the mechanical portion of the disk drive. When power is applied to the disk drive, the circuit board logic powers up and the HDA spins up. During spin up, the HDA requires a higher current than when it is in steady state, i.e., already spun up. This higher current is typically more than two times the steady state current. Therefore, if a storage system attempts to spin up many drives in the system at the same time, the system is required to support a peak power level that is much greater than the maximum power required to operate at steady state.

The more disk drives the system supports, the greater the peak power requirement. It is too expensive to provide a power subsystem that can support enough peak power to spin up many disk drives at once, especially when the excess power is not otherwise needed.

Some types of disk drives offer a separate HDA power input but no built in control over the timing of the application of power to the HDA. Some other types offer limited control. For example, Fibre Channel ("FC") disk drives compliant with the SFF-8045 rev. 4.7 standard ("SFF-8045" or "8045") allow the timing of HDA spin up to be controlled via two signal pins, Start_1 and Start_2, that allow the HDA to spin up based on three different conditions. Depending on the state of the Start_1 and Start_2 signals, the disk drive HDA will start drawing current either 1) immediately; 2) after it receives its first SCSI command, or 3) based on its arbitrated loop physical address (ALPA). This provides limited means to stagger the timing of spin up amongst all the drives such that system peak power requirements can be minimized. However, it is difficult for system software to use SCSI commands to control drive spin up timing, because insert and power control signals from the drives are asserted much faster than software can respond. (Under SCSI command mode, the drive is spun up by the controller issuing the command by the same process as data transfer commands are issued. In some interfaces, such as the ATA interface in at least some implementations, command mode is the only protocol available for drive power state management (i.e., there are no start bits).)

The ALPA address method is also disadvantageous in at least some circumstances. Consider a storage system capable of supporting 48 disk drives. If a user plugs a single disk drive into the 48th slot in a system in which the other drives are all already at steady state, there is no power-related reason why the drive should not spin up immediately. But because its spin up timing depends on its ALPA address, it will nonetheless take several minutes to spin up.

SFF-8045 describes a POWER_CONTROL (also known as "power control", "Pwr_control", "Pwr_ctrl", or "P_ctl") signal driven to the drive to control 5V and 12V power switches located on the drive. When this signal is asserted, high, 5V and 12V supplies are applied to the drive circuitry. When this signal is negated, low, 5V and 12V supplies are not connected to the drive circuitry, so that the drive circuitry is powered down. As described in SFF-8045, the drive provides a 10 KOhm pull up resistor from this signal to the 5V input to the drive.

SUMMARY OF THE INVENTION

A method is used in powering disk drive spinup. A disk drive is powered with a primary power source and is temporarily powered with a secondary power source in addition to the primary power source. The secondary power source powers the disk drive when the disk drive is spinning up.

One or more implementations of the invention may provide one or more of the following advantages.

Disk drives can be made available for data communication quickly and efficiently without excessive use of power. Data centers can save significant amounts of power and expense with little or no adverse affect on performance.

Other advantages and features will become apparent from the following description, including the drawings, and from the claims.

BRIEF DESCRIPTION OF THE DRAWINGS

FIGS. 6A-6C are illustrations of power characteristics of the power supply of FIG. 5.

DETAILED DESCRIPTION

Figure 1:
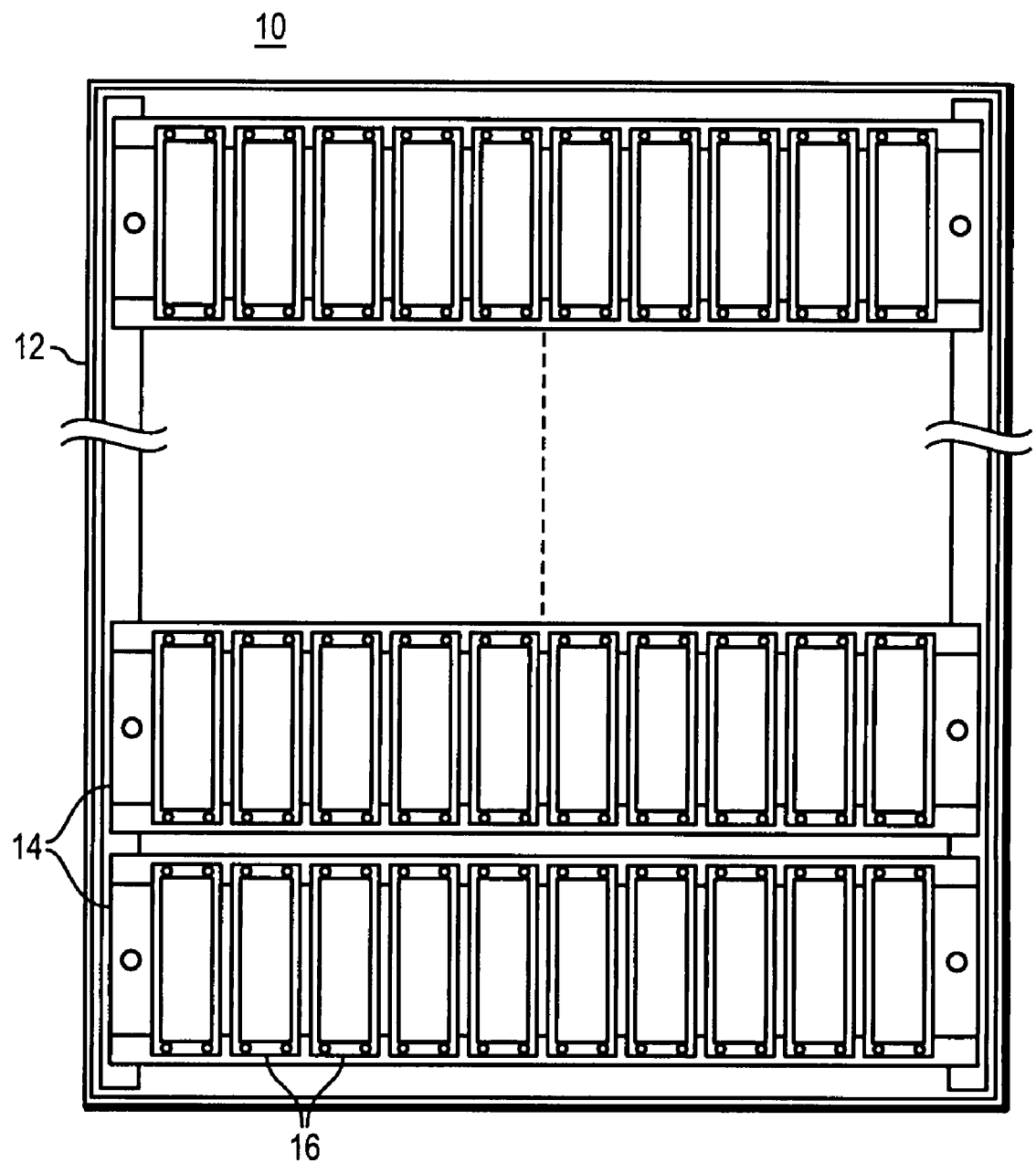
FIG. 1 is a representation of a rack of storage systems in which the invention may be employed.

Described below is a technique for use in powering disk drive spinup. In at least some implementations, the technique reduces data-access times for powered down ("spun-down") or slow-spin array states, and enables a system to provide fast recovery times from slow-spinning or spun-down rotating storage media by which power is saved during periods of inactivity.

Preferably, to minimize or nearly minimize the time to access the data, all disks in a spun-down or slow-spinning state that are required to service the request are spun up simultaneously. However, this takes additional energy, i.e., a short term energy surge, and conventionally in large system configurations, or in large data centers with multiple systems, this surge may not be available from the power distribution network. For example, a test of one typical disk drive revealed that spinning up drew approximately an extra 1.5 amps of current from a 12 volt DC power source for the duration of spin up, approximately 14 seconds, and that spin up required approximately 80 joules of energy. Since a power supply that converts standard AC power to 12 volt DC power is not perfectly efficient, such spin up results in a short term energy surge in the power distribution network of even more than 80 joules for every disk drive like the tested drive.

In accordance with the technique, a localized energy source (e.g., battery/inverter, or supercapacitor network) provided as described below stores energy during the spun-down state when the array is idle, and uses that energy to supplant or replace the power distribution network source during the spin-up process. This allows the short term energy needs of the spin-up to be met without placing additional burden on the power distribution network, and by reducing the time to data-available, allows the array to operate in additional environments where long data-access delays due to conventional practice may prevent spin-down from being used.

In particular, conventional systems typically require several minutes to recover large groups of spun-down or slow-spinning disks, because of the limitations imposed by the amount of power available from the distribution network. Disk drives require the short term energy surge in order to accelerate the media to the correct operating speed. In at least one conventional system, as a result, only a subset of disks can be accelerated at any given time, which increases the delay to access to data in the case where a large number of disks need to be spun up simultaneously.

With respect to conventional data storage systems having disk subsystems, such subsystems are limited in instantaneous power capacity due to cost. In addition, there is a constraint placed upon a conventional system composed of such modules, in that the site power infrastructure is limited in instantaneous power capacity. These limits translate into longer response times for power up, and also force longer response times for drive spin up in systems that implement drive spin down. Such longer response times cause delays in accessing data that may range from merely annoying to causing systems to time out, panic, or assume failure on the part of the subsystem.

Use of the technique to shorten the response time of the disk subsystem can help increase the use of power down and drive spin down as methods for conserving power when systems are not being accessed. The less the performance penalty, the more often spin down can be used, and the more power can be saved. For example, if an enterprise's central data storage facilities include hundreds or thousands of disks, conventionally it can be prohibitively power consumptive and crippling to spin up all of these disks simultaneously, e.g., at 1 pm after lunch on a weekday, and conventionally it can be prohibitively slow to stagger the spin up of all of these disks at such a time, and therefore conventionally these disks are not spun down during medium-length periods of general inactivity such as lunchtime, which represents a missed opportunity for power conservation.

Referring to FIG. 1, there is shown an example of equipment, specifically a rack mount system 10, in which the technique may be employed. It is to be understood that this is just an example, and the technique may be employed in any of many different types of systems that use one or more disk drives.

A rack mount cabinet 12 includes several storage systems 14. Each storage system 14 has installed therein several disk drives 16.

Figure 2:
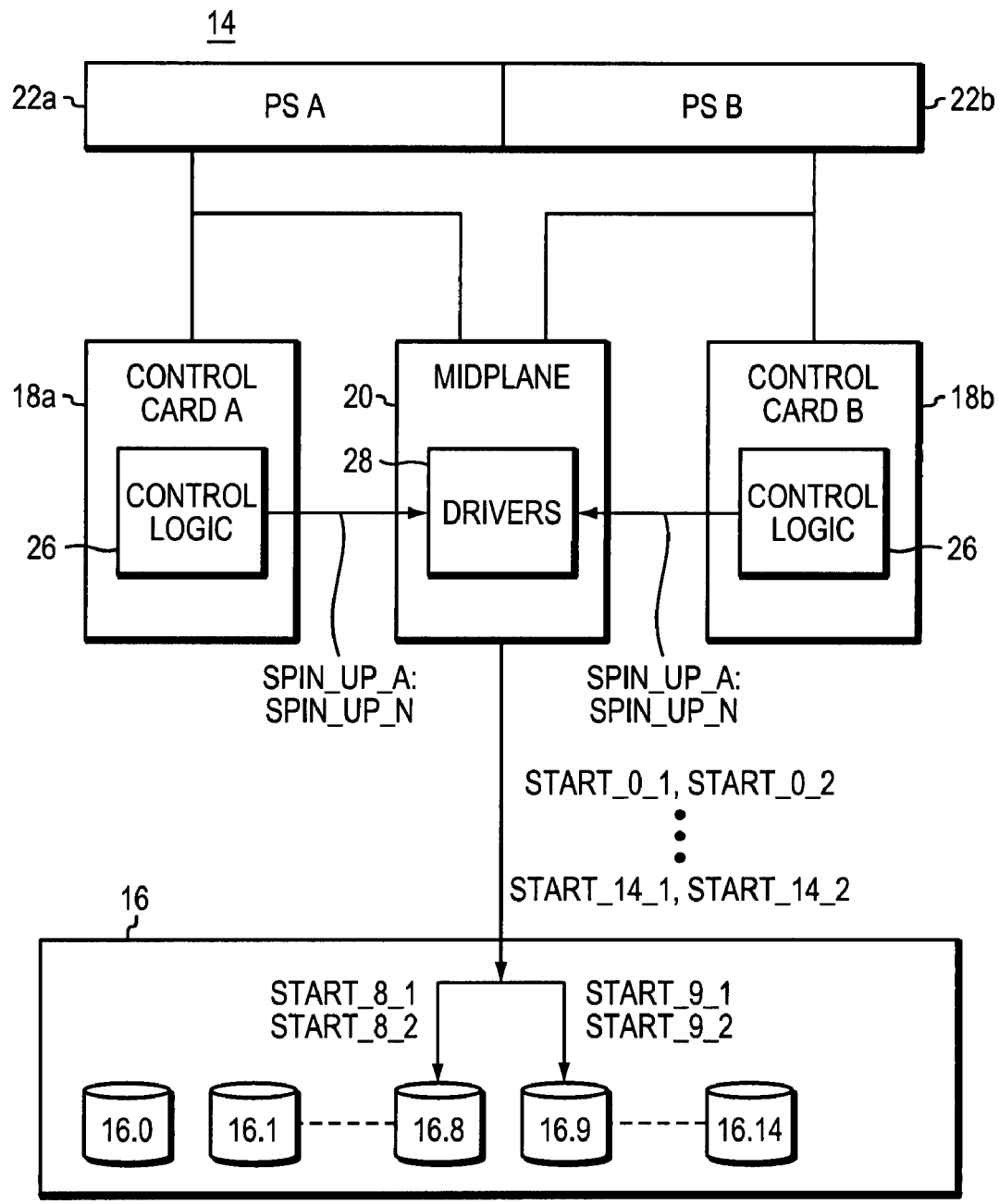
FIGS. 2-4 are schematic representations of components of a storage system of FIG. 1, showing control logic.

The amount of storage in the multi-chassis system can be increased by adding new storage systems 14 to the rack mount system 10, and by adding more disk drives 16 to one or more of the storage systems 14. A functional block diagram of one of the storage systems 14 is shown in FIG. 2. The storage system 14 includes two redundant link control cards (LCCs) 18a and 18b to provide high availability of the system. The LCCs 18a,b are coupled to a midplane 20. Disk drives 16, herein shown as 15 disk drives 16.0-16.14, are also coupled to the midplane 20.

Each LCC 18a,b communicates with all the drives 16.0-16.14 via the midplane 20. Power is supplied to the LCCs 18a,b, the midplane 20, and the disk drives 16 by a redundant set of power supplies 22a,b.

Since each storage system 14 can include up to 15 disk drives 16, it is not practical, without the technique, to provide power supplies 22a,b with enough power (e.g., peak power) to spin up all 15 disk drives at once. Therefore, conventionally, the disk drives 16 are spun up in sequential stages. During each sequential stage a certain number of disk drives 16 may be spun up based on parameters related to the power requirements of the system. Control logic 26 may control the timing of disk drive spin up.

In the generalized embodiment shown in FIG. 2, each controller board 18a, 18b includes identical control logic 26 for driving Spin-up signals Spin-up_A-Spin-up_N to drivers 28 on the midplane 20. The disk drives 16 are herein shown to be Fibre Channel drives. A Fibre Channel drive accepts as input two Start signals that switch on power to the HDA portion of the drive. (Start signals are referred to collectively; individual Start signals are referred to with a suffix.) The drivers 28 on the midplane 20 drive these pairs of Start signals to each of the drives. When both Start signals for a given drive are asserted, the HDA portion of the drive spins up.

The drives 16 in the system are preferably hot pluggable, meaning that drives 16 can be plugged into the system not only prior to power up but also at any time after it has been powered up.

Drives 16 in accordance with the 8045 specification accept the input herein denoted Pwr_control. When the Pwr_control signal is asserted, power is provided to the entire drive 16, including the logic board and HDA portions. When Pwr_control is deasserted, no power is provided to either the logic board or HDA. If the drive Start inputs are asserted, and the Pwr_control input is deasserted, the drive will not spin up. On the other hand, if the start bits are asserted, and then the Pwr_control input is asserted, the drive will spin up immediately in response to the assertion of Pwr_control.

Figure 3:
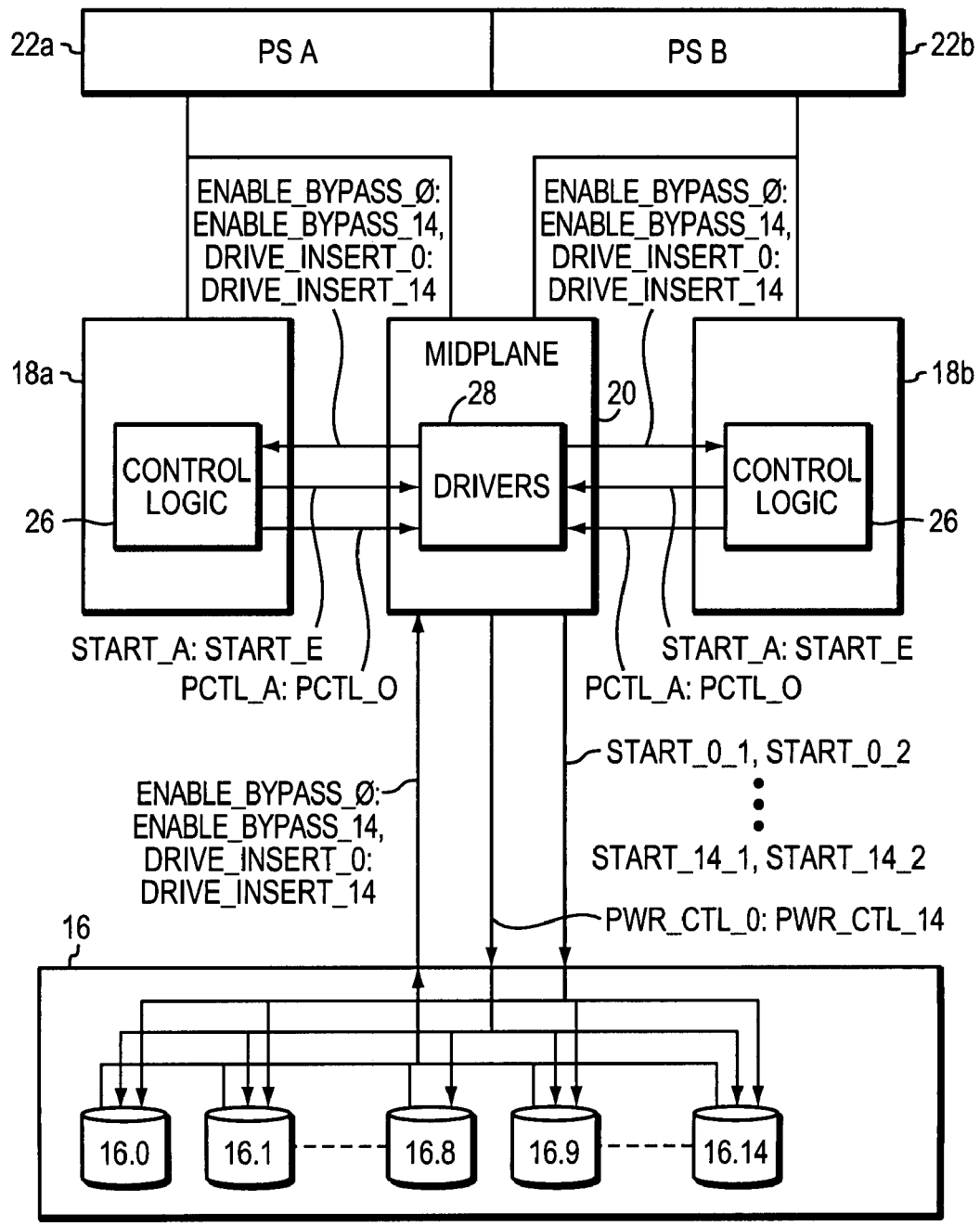

As shown in FIG. 3, the system includes the control logic as shown in FIG. 2. The control logic 26 produces in addition Pctl signals Pctl_A-Pctl_O, which are used to drive Pwr_ctl_0-Pwer_ctl_14 signals to the drives 16.0-16.14 respectively. Each drive 16.0-16.14 provides a corresponding presence (drive inserted) signal Drive_Insert_0-Drive_Insert_14 and can provide a corresponding Enable Bypass signal Enable_Bypass_0-Enable_Bypass_14, each of which is driven to the control logic 26 on each LCC 18a, 18b. When a drive is inserted into the system, the corresponding Drive_Insert signal is asserted.

Figure 4:
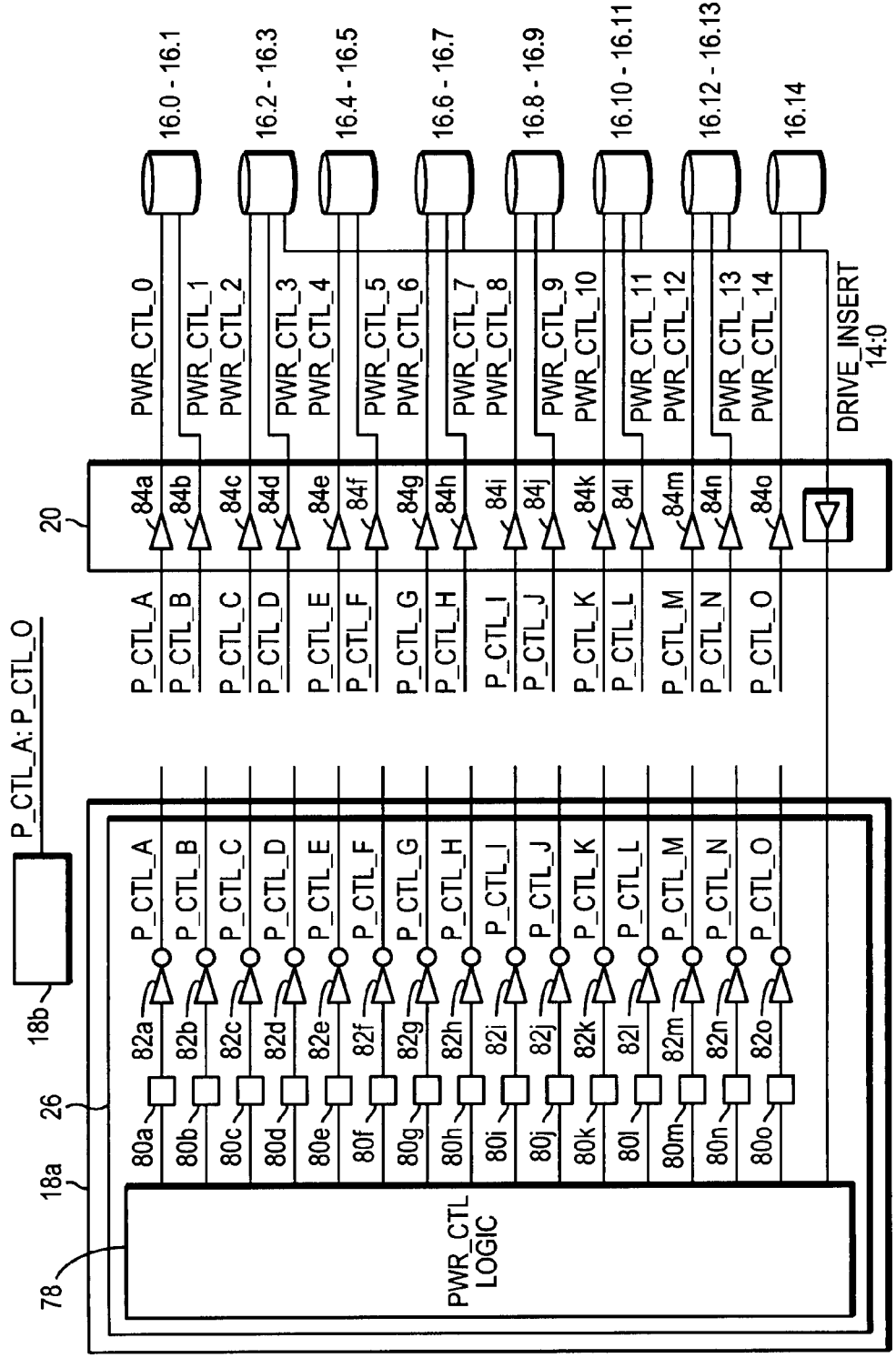

More particularly, as shown in FIG. 4, the control logic 26 further includes power control logic 78. The power control logic 78 accepts as input the Drive_Insert_14-Drive_Insert_0 signals from the disk drives 16. The power control logic 78 drives registers 80a-80o. Each register 80a-80o drives a corresponding inverter 82a-82o. The inverters produce as output P_Ctl signals P_Ctl_A-P_Ctl_O. Each signal P_Ctl_A-P_Ctl_O is input to a corresponding driver 84a-84o on the midplane 20. The other LCC 18b also produces the signals P_Ctl_A-P_Ctl_O, and these signals are wire-or'd to the corresponding signals from the LCC 18a. The drivers 84a-84o output Pwr_Ctl signals Pwr_Ctl_0-Pwr_Ctl_14, the Pwr_control signals for corresponding disk drives 16.0-16.14.

Power is saved by spinning down a drive when it is not being used.

Figure 5:
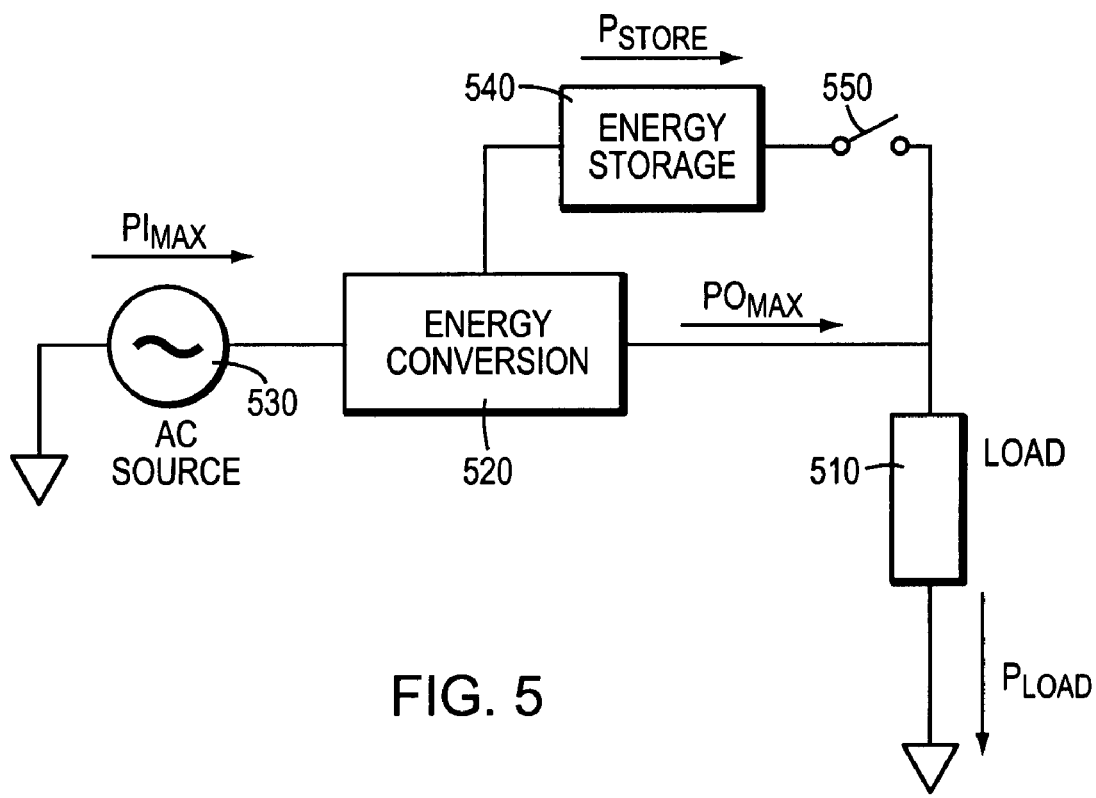
FIG. 5 is a block diagram of a power supply for use with the storage system of FIG. 1.

FIG. 5 illustrates an example implementation of the technique. A load 510, which may be at least a portion of a disk drive, consumes power $P_{LOAD}$ drawn at least in part from energy conversion apparatus 520 (e.g., AC to DC power conversion apparatus) deriving power $PO_{MAX}$ from power $PI_{MAX}$ provided by, in this example, an A/C power source 530. FIG. 6A illustrates that load 510 incurs power consumption spikes 610, 620 on initial power up and on spin up, respectively. As shown in FIG. 6A, except for such spikes, power $PO_{MAX}$ and power $PI_{MAX}$ are sufficient to power load 510.

In accordance with the technique as shown in FIG. 5, energy storage apparatus 540 is provided to supply sufficient additional power $P_{STORE}$, when appropriate, to load 510. In particular, in combination with power $PO_{MAX}$, power $P_{STORE}$ is sufficient to cover spikes 610, 620. Thus, as shown in FIG. 6B, the use of apparatus 540 effectively eliminates spikes 610, 620 with respect to the draw on apparatus 520, and power $PO_{MAX}$ is sufficient to power load 510 in all phases.

As shown in FIG. 5, switch 550 may be provided to allow energy storage apparatus 550 to be connected (and drawn upon) only when needed, e.g., when load 510 is initially powering up or is spinning up. In at least one implementation, the state (open or closed) of switch 550 may be controlled or influenced by one or more of the power control signals described above (e.g., Pwr_control input).

Apparatus 540 may be, include, or be included in one or more types of power sources. For example, apparatus 540 may include a rechargeable power source, and FIG. 6C illustrates an example of charging apparatus 540 when load 510 is not initially powering up and is not spinning up, and of draining apparatus 540 when load 510 is initially powering up or is spinning up. The rechargeable power source may be or include a rechargeable battery or a capacitor.

In at least one implementation, apparatus 540 may be charged using energy from apparatus 520 as shown in FIG. 5. In particular, apparatus 540 may be charged by apparatus 520 when apparatus 520 is not fully taxed powering load 510. In at least some implementations, since peaks 610, 620 occur relatively rarely in the overall power consumption pattern of load 510, it is practical to charge apparatus 540 at a slower rate than it discharges during peaks 610, 620.

Apparatus 540 may be disposed in one or more of different positions in the data storage system. For example, apparatus 540 may be positioned with an overall power supply for the data storage system and/or with a power supply for an enclosure that represents a portion of the data storage system. In another example, apparatus 540 may be positioned within each disk drive unit and load 510 may be or include the HDA portion of the drive so that additional power is available when the HDA portion spins up. For example, apparatus 540 may include regenerative power apparatus in the disk drive to transfer power from the HDA portion to apparatus 540 during spin down, which transferred power is then provided back to the HDA portion on spin up.

In another example, apparatus 540 may include a nonrechargeable power source, such that its benefit is at least potentially of limited duration.

In another aspect, the technique may be used to provide protection against common real world power glitches, i.e., brief power interruptions, that can cause disk drive spinup problems. For example, conventionally if a disk drive loses power for a few seconds, it must be fully spun up again before its data can be made available. Thus, for example, conventionally if a power glitch requires all of an enterprise's hundreds or thousands of disks to be spun up again, this presents the same power consumption and delay problem described above for the case of spin down for power conservation. Conventionally this also presents a data latency problem for transactions in process, in that such transactions may time out during spinup and cause problems for applications and operating systems.

Thus, switch 550 may be activated when power is lost, so that apparatus 540 can keep drives spun up during the power glitch, providing a "ride-through" capability so that the drives remain spun up and do not need to be spun up again which would incur power consumption spikes and cause delays.

Any of multiple different spin up and/or spin down regimes may be used. For example, the disk may be considered spun down if power is removed or reduced for both the circuit board logic and the HDA. In another example, the disk may be considered spun down even if power is removed or reduced only for the HDA. In at least some cases, since the majority of the power consumed by the disk is consumed by the HDA, the management of power to the HDA is more important than management of power to the circuit board logic. In at least some systems, if power is removed for the circuit board logic, the system needs to perform extensive and time consuming reorganization work to allow the disk to rejoin the system once power is restored to the circuit board logic. Thus, in such systems, for performance reasons, it may be desirable to maintain power to the circuit board logic while removing or reducing power for the HDA.

All or a portion of the technique or a distributed version of the technique may be implemented and/or executed at one or more of any of various points in the system's architecture, e.g., at the circuit logic board, at a disk drive controller, in the system's basic input/output system (BIOS) and/or in an operating system. Since a data storage system uses disk drives in sets, in at least some cases it can be important to implement the technique at a point such as power supplies 22a,b, by which all of the drives in a set may be spun up or spun down at the same time.

In general, the system seeks to conserve power when disk drive resources are not needed. The system may apply a policy in the technique to determine whether the disk drive should be spun up or spun down. Policies may be utilized generally in the scheduling of disk drive spin up and/or spin down.

Other embodiments are within the scope of the following claims. For example, the above-described technique and/or aspects may be implemented, entirely or in part, in hardware or software (which may include firmware) or both hardware and software.

What is claimed is:

1. A method for use in powering disk drive spinup, comprising:
    powering a disk drive with a primary power source;
    applying a policy to select between first and second desired spinning states for the disk drive, wherein the first desired spinning state comprises spinning up and the second desired spinning state comprises spinning down; and
    based on a result of applying the policy, temporarily powering the disk drive with a secondary power source in addition to the primary power source, the secondary power source powering the disk drive when the disk drive is spinning up.

2. The method of claim 1, wherein the primary power source comprises an AC to DC power conversion apparatus.

3. The method of claim 1, wherein the disk drive incurs power consumption spikes on spin up.

4. The method of claim 3, wherein except for the spikes, the primary power source is sufficient to power the disk drive.

5. The method of claim 3, wherein temporarily powering the disk drive with the secondary power source in addition to the primary power source is sufficient to cover the spikes.

6. The method of claim 1, further comprising:
    drawing upon the secondary power source only when needed to power the disk drive.

7. The method of claim 1, further comprising:
    by a switch, connecting the secondary power source only when needed to power the disk drive.

8. The method of claim 1, wherein the secondary power source comprises a rechargeable power source.

9. The method of claim 1, further comprising:
    charging the secondary power source when the disk drive is not spinning up.

10. The method of claim 1, wherein the secondary power source comprises a rechargeable battery.

11. The method of claim 1, wherein the secondary power source comprises a capacitor.

12. The method of claim 1, further comprising:
    charging the secondary power source using energy from the primary power source.

13. The method of claim 1, further comprising:
    charging the secondary power source at a slower rate than the secondary power source discharges when the disk drive is spinning up.

14. A system for use in powering disk drive spinup, comprising:
    a primary power source powering a disk drive;
    a secondary power source configured to temporarily power the disk drive in addition to the primary power source powering the disk drive;
    a first mechanism configured to apply a policy to select between first and second desired spinning states for the disk drive, wherein the first desired spinning state comprises spinning up, and the second desired spinning state comprises spinning down; and
    a second mechanism configured, based on a result of applying the policy, to enable the secondary power source to power the disk drive when the disk drive is spinning up.

15. The system of claim 14, wherein the secondary power source is positioned with an overall power supply for the system.

16. The system of claim 14, wherein the secondary power source is positioned within the disk drive unit.

17. The system of claim 14, wherein the disk drive comprises an Head and Disk Assembly (HAD) portion, and wherein the secondary power source temporarily powers the HAD portion in addition to the primary power source powering the HAD portion.

* * * * *